United States Patent
Li et al.

(10) Patent No.: US 9,991,494 B2
(45) Date of Patent: Jun. 5, 2018

(54) NANO MICROPOROUS DIAPHRAGM OF POST-CROSSLINKED RUBBER AND POLYOLEFIN COMPOSITE, AND MANUFACTURING METHOD THEREOF

(75) Inventors: Xin Li, Beijing (CN); Jianhua Li, Tianjin (CN); Wei Chen, Tianjin (CN); Yongjun Jiao, Tianjin (CN); Long Li, Tianjin (CN); Xinjian Deng, Tianjin (CN)

(73) Assignee: TIANJIN DG MEMBRANE CO., LTD., Tianjin (CN)

( * ) Notice: Subject to any disclaimer, the term of this patent is extended or adjusted under 35 U.S.C. 154(b) by 1262 days.

(21) Appl. No.: 14/442,098

(22) PCT Filed: Jul. 22, 2011

(86) PCT No.: PCT/CN2011/077483
§ 371 (c)(1),
(2), (4) Date: May 12, 2015

(87) PCT Pub. No.: WO2012/142802
PCT Pub. Date: Oct. 26, 2012

(65) Prior Publication Data
US 2015/0325830 A1    Nov. 12, 2015

(30) Foreign Application Priority Data
Apr. 22, 2011   (CN) .......................... 2011 1 0101783

(51) Int. Cl.
| | |
|---|---|
| H01M 2/16 | (2006.01) |
| H01M 10/0525 | (2010.01) |
| H01M 2/14 | (2006.01) |
| C08L 21/00 | (2006.01) |

(52) U.S. Cl.
CPC ......... *H01M 2/1686* (2013.01); *H01M 2/145* (2013.01); *H01M 2/1653* (2013.01); *H01M 10/0525* (2013.01); *B32B 2457/10* (2013.01); *C08L 21/00* (2013.01)

(58) Field of Classification Search
CPC ............... H01M 2/1686; H01M 2/145; H01M 10/0525; H01M 2/1653; B32B 2457/10; C08L 21/00
See application file for complete search history.

(56) References Cited

U.S. PATENT DOCUMENTS

| | | | | |
|---|---|---|---|---|
| 2004/0080068 | A1* | 4/2004 | Ooizumi ............... | B29C 43/222 264/41 |
| 2007/0251572 | A1* | 11/2007 | Hoya .................. | C08L 23/0815 136/256 |
| 2010/0305217 | A1* | 12/2010 | Qiu ................... | B01D 67/0088 514/772.3 |

FOREIGN PATENT DOCUMENTS

| | | |
|---|---|---|
| CN | 1424348 A | 6/2003 |
| CN | 1498744 A | 5/2004 |
| CN | 1744349 A | 3/2006 |
| CN | 1771616 A | 5/2006 |
| JP | 2003-119313 A | 4/2003 |
| JP | 2010-267466 A | 11/2010 |
| WO | 2009028737 A1 | 3/2009 |

* cited by examiner

*Primary Examiner* — Lisa A Park
(74) *Attorney, Agent, or Firm* — Matthias Scholl, PC; Matthias Scholl

(57) ABSTRACT

The present invention relates to a composite nano microporous diaphragm for use in lithium ion cells using polyolefin modified with post-crosslinked rubber and manufacturing method thereof. The microporous diaphragm at least comprises a nano microporous diaphragm A layer with a chemical gel content of more than 20%, the microscopic structure thereof is designed to be the rubber material that has been evenly dispersed and has subjected to a post-crosslinking treatment in polyolefin nano microfiber matrix, forming a nano microporous diaphragm of rubber-plastic composite. The nano microporous diaphragm with high strength, thermal cutoff, high temperature resistance, as well as good liquid absorption and swelling and compression elasticity can be applied to lithium ion power cells with high safety and long cycling life.

9 Claims, No Drawings

NANO MICROPOROUS DIAPHRAGM OF POST-CROSSLINKED RUBBER AND POLYOLEFIN COMPOSITE, AND MANUFACTURING METHOD THEREOF

CROSS-REFERENCE TO RELATED APPLICATIONS

This application is a National Stage Appl. filed under 35 USC 371 of International Patent Application No. PCT/CN2011/077483 with an international filing date of Jul. 22, 2011, designating the United States, and further claims priority benefits to Chinese Patent Application No. 201110101783.9 filed Apr. 22, 2011. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a nano microporous membrane for lithium ion batteries, which is based on a post-crosslinked rubber-modified polyolefin and a manufacturing method thereof, and more particularly to a microporous membrane based on a composite material of a rubber and a polyolefin suitable for use in lithium ion batteries and energy storage cells having high safety and reliability and long cycle life.

Description of the Related Art

Polyolefin microporous membrane has nano micropores (having an average pore size of less than 200 nm) in the form of a penetrable three dimensional network and features high voltage oxidation resistance and stability in organic electrolytes of lithium ion batteries. As a membrane material, the polyolefin microporous membrane has been widely applied to lithium ion batteries of cell phones and notebook computers. Typical commercial polyolefin microporous membranes include: a three-layer of PP/PE/PP composite membrane prepared by a dry method, and a single layer of PE membrane (porosity of 30-65% and common thickness of 16, 20, 25, and 30 µm) having a large molecule weight prepared by a wet method.

The existing polyolefin microporous membrane is unable to satisfy the high requirements of power batteries with regard to both the cycle life and the safety and reliability. Primary technologies are analyzed as follows:

The present three-layer of PP/PE/PP composite membrane prepared by the dry method is disadvantageous in the following respects:

1. The strength and toughness of the membrane are deficient, and the membrane is prone to tear in the transverse direction.

2. Although the middle microporous layer employs PE that has the shutdown temperature of 135-145° C., the fusion point thereof is limited, and drawbacks of large thermal shrinkage and membrane rupture at high temperatures still exist in the hot stretched PP microporous layers at the temperature of above 130° C.

3. Compressible elasticity and stress absorbency are insufficient in the thickness direction.

To improve the transverse rupture resistance of the PP/PE/PP membrane prepared by the dry method, Chinese patent publication number CN 02152444.0 disclosed a method including blending less than 10 wt. % of thermoplastic polyolefin elastomers, i.e., ethylene-propylene methylene copolymer (EPM) and ethylene propylene diene rubber (EPDM), into a polyolefin matrix, and stretching a resulting mixture to produce pores. However, the nature of the thermoplastic polyolefin elastomers determines the formation and distribution of crazes in the polyolefin matrix during the cold stretching, that is, the capability of pore-formation through stretching the polyolefin matrix using the dry method is influenced, and the proper porosity cannot be obtained. Thus, the proportion of the added thermoplastic polyolefin elastomers must be as small as possible. As a result, the elastic property is improved slightly, resulting in low applicability.

U.S. Pat. No. 4,650,730, U.S. Pat. No. 4,431,304, and U.S. Pat. No. 5,691,077 disclose multi-layer membrane structures, in which, some adopts self-flattening process of the tubular polypropylene membrane and some adopts multi-layer membrane composite process. In the formed PP/PE/PP structure, the intermediate PE layer exhibits capacity of high temperature shutdown. However, the above patents only disclose the high temperature shutdown capacity of the membrane but not prolong the cycle life and improve the reliability of the lithium ion dynamic batteries.

Another process is the wet method, also called thermally induced phase separation, in which, polyolefin resin of large molecular weight and a high temperature compatibilizer (alkane liquid having a high boiling point, such as paraffin oil or other ester plasticizer, the solvent and the polyolefin are dissolved with each other in the thermodynamic sense at a high temperature and blended at the molecular level; the high temperature compatibilizer is actually a solvent) are mixed, the heated and evenly blended high temperature melt is quickly solidified on the surface of the cooling roller, and the phase separation occurs in the process of the temperature drop. The resulting lamina is stretched and strengthened using biaxial stretch step by step or synchronous biaxial stretch. The high temperature compatibilizer is extracted from a semi-finished product membrane using a volatile cleaning solvent, and a microporous membrane having nano-sized pores communicating with each other is obtained after second hot stretching strengthening, hot-setting, and cooling. The method is generally used to prepare the single layer of PE membrane. Compared with membranes prepared by the dry method, the membrane prepared by the wet method has improved transverse tensile strength and transverse elongation at break because that the wet method adopts the biaxial stretching strengthening and that the weight average molar mass of the raw material is generally above 500 thousand. The current membrane prepared by the wet method has the following disadvantages:

1. Compared with the dry method, the wet method must adopt the solvent extraction process, resulting in a higher production cost.

2. The thermal shrinkage is slightly larger at the temperature of above 130° C.

3. The high temperature rupture resistance is low at the temperature of above 130° C.

4. Under the same elasticity in the thickness direction, the membrane prepared by the wet method lacks the stress absorbency, and the safety and reliability and the cycle life of the battery cannot satisfy the high level requirement of the power battery.

In addition to the polyolefin microporous membrane, there is a microporous physical gel membrane prepared by a solvent-induced phase separation method, such as a PVDF-HFP copolymer microporous physical gel membrane (belongs to the physical gel and is dissolvable in acetone) prepared by Bellcore process. The microporous physical gel membrane when in use is cohered to pole pieces by hot pressing process to form integral pole pieces, and the cycle life of the battery is relatively long. However, the PVDF-HFP copolymer microporous physical gel membrane has slightly larger pore size, approximately 0.5-2 µm. Such a membrane is not treated by the hot stretching and strengthening and has low mechanical strength, poor stretching strength, very small elasticity modulus in the planar direction, and is inadaptable to the battery rolling process, that is, even lamination process is adopted, it is also required to improve the thickness (normally designed to be 40-60 µm) of the membrane to prevent the short circuit of the battery. The larger the thickness of the membrane is, the larger the resistance of the electrolyte between the negative pole piece and the positive pole piece is, which is not beneficial for rate capability and the energy density of the battery.

For increasingly high requirements in the application market, the membrane is required to possess the following characteristics:

1. Uniform thickness, nano-scale pore size, appropriate planar direction, and uniformly distributed porosity.

2. On the mechanical aspect, the membrane is required to possess high tensile strength, high toughness in the transverse direction, press resistance and puncture resistance in the thickness direction to prevent the physical short circuit.

3. When the temperature unexpectedly reaches 130-200° C. inside the battery, the membrane must have the fusion shutdown property, with small thermal shrinkage, high temperature rupture resistance, and mechanical integrity even in the fusion state.

4. The membrane should have excellent compressible elasticity in the thickness direction. In another word, the membrane has proper elastic deformation capacity to adapt to the bulging of the negative pole piece so as to avoid deformation and wrinkling resulting from uniform compressive stress. Sharp decrease in porosity or even closure of the micropores does not occur during the stress deformation, thereby ensuring the normal discharge of the battery. In addition, the membrane possesses the resilience after being releasing from the compressive stress, thereby ensuring the uniform and tight contact among the positive pole piece, the membrane, and the negative pole piece and avoiding local lean solution.

To improve the high temperature shrinkage resistance and the high temperature rupture resistance of the current polyolefin microporous membrane, Chinese patent application numbers 200880003493.7 and 200880000072.9 disclose technical solutions including using a caking agent to link the fine ceramic powder to the polyolefin microporous membrane to form a composite membrane having a microporous coating layer. Chinese patent application number 200510086061.5 discloses a technical solution for preparing a microporous coating layer on the surface of the polyolefin microporous membrane using high temperature resistant polyamide, polyamideeimide, polyimide having melt points of exceeding 180° C. Chinese patent application number 200480034190.3 proposes a technical solution including coating a gelled fluororesin on the surface of the polyolefin microporous membrane to form the coating layer. All the above technical solutions adopt the coating method to form the coating layer on the polyolefin microporous membrane, however, disadvantages thereof are as follows:

1. Because the polyolefin membrane basically belongs to the inert material, the bonding force of the polyolefin membrane to the coating layer is not enough, too thick coating results in easy separation from the membrane, and too thin coating inhibits the thermal shrinkage function of the polyolefin membrane.

2. Capillary action exists in the micropores of the polyolefin membrane. The gel in the slurry easily enters the micropores of the polyolefin membrane when coating the composite membrane, which may affect the pore size distribution of air permeability of the membrane after solvent evaporation, desiccation, and formation of the membrane. The consistency of the membranes produced in batches using the coating method is difficult to control, and the production costs thereof are high.

To improve the bonding strength of the membrane to the positive pole piece and to improve the safety in overcharge resistance of the lithium ion battery, Chinese patent publication number CN 01112218.8 has disclosed a method including blending a monomer polymer that is able to form a gel by thermal crosslinking into an electrolyte for improving the bonding strength of the membrane with the positive pole piece. However, during the thermal crosslinking of the gel, gel also forms in the micropores of the membrane, thereby affecting the permeability of the membrane. Furthermore, the remaining monomer may be oxidized at the positive pole piece and thus produces gas, or even affects the cycle performance of the battery.

To improve the compression resistance property of the wet method, Chines patent application numbers 200680010010.7, 200680010890.8, 200680010912.0, and 200680031471.2 disclose technical solutions for regulating the hot stretching. However, the compressible elasticity of the membrane is partly improved, and the membrane exhibits a certain thickness change rate only under high compressive stress and high temperature (2.2 megapascal/90° C.), which cannot satisfy the practical application requirements of the battery. Generally, the compressive stress between the pole piece and the membrane does not exceed 50 PSi (0.35 megapascal), otherwise the battery bulges. In addition, the inner pressure of the battery is higher than 0.7 megapascal, the safety valve easily fails. Except the high temperature of 85-90° C. is used for dehydration before the injection of the battery, a normal service temperature of the battery is between −10 and +60° C. Thus, the membrane is required to adapt to the compressible elasticity in normal charging-discharging conditions within a normal service temperature range.

Chinese patent application number 200680035668.3, 200780005795.3, and 200510029794.5 also disclose the co-extruded membrane preparation in the polyolefin composite membrane prepared by the wet method, which primarily includes regulating the solid content of the polyolefin raw material and the polyethylene/polypropylene ratio and controlling the molecular weights of raw materials for different layers to obtain different interlayer porosities, pore size distributions, and melt points of different membrane layers. However, such co-extruded composite membranes have defects in improving the membrane rupture resistance, the compression resistance, and the resilience of the membrane.

Typical materials for the dynamic vulcanization of thermoplastic elastomer dense material (TPO, TPE, and TPV) based on rubber/plastic blended polyolefin include PP/EPDM, PE/PSBR, and PE/EPDM. The dynamic vulcanization generally adopts a crosslinking agent to dynamically crosslink the rubber phase in the blending of the materials, and shear melting is conducted along with the dynamic crosslinking. Microstructure of the cooled material is in the form of sea/island, that is, the plastic phase is in a continuous phase, and the rubber phase is distributed in the plastic phase like islands. As restricted by the high elasticity of the rubber phase, the mixing, shearing, dispersing capacities of the devices, the particle size of the rubber phase is in a scale of several μm or even tens or hundreds of μm, but a submicron or nanoscale distribution effect is rarely achieved.

Based on the relationship between the membrane material and the safety and reliability and the service life of the lithium ion battery, in order to tackle the shortages of the microporous membrane of single-layered or double-layered polyolefin, Chinese patent application number 201110055620.1 filed by present inventors proposed a technical route adopting a co-extruded composite membrane modified by nano pre-crosslinked rubber fine powder and a lithium ion battery using the same. The raw material of the rubber fine powder is in the pre-crosslinked physical and chemical state, the primary particles are the nano particle that is prone to agglomeration. Secondary particle after the agglomeration have particle sizes of 5-50 μm, however, the secondary particles are difficult to uniformly distribute in the polyolefin microporous membrane matrix, so that it is difficult to acquire the membrane product having high thickness accuracy (±2 μm), uniform distributed microstructure and mechanical property. In addition, the nano rubber fine powder has high production cost.

Based on the study on the correlations among the rubber/plastic blending dynamically crosslinked thermoplastic elastomer, the processing of the nano microporous membrane of the polyolefin, and the microstructure of the nano microporous membrane, the raw materials and the processing method for the membrane are newly developed and regulated in the invention, so that the rubber material with high elasticity is uniformly distributed into the polyolefin nano microporous matrix, and the improved nano microporous membrane of the polyolefin possess the above properties for improving the safety and reliability and the cycle performance and overcoming the shortages in the prior art.

SUMMARY OF THE INVENTION

A microporous membrane of the invention comprises at least one nano microporous membrane layer A having at least 20 wt. % of a chemical gel, and a microstructure thereof is a nano microfiber matrix of polyolefin in which a post-crosslinked rubber is uniformly distributed, whereby forming a nano microporous membrane of a rubber-plastic composite material. A rubber-plastic ratio of a rubber material to a polyolefin plastic material is between (20:80) and (60:40). The nano microporous membrane of the composite material is a single layer A, and preferably a double-layer A/B; for the double-layer A/B, the layer B employs the polyolefin plastic as a main body, and the rubber accounts for less than 20 wt. % of the layer of the rubber-plastic composite material. The nano microporous membrane of the composite material has the following properties:

1) The nano microporous membrane of the composite material has a total thickness of 8-40 μm, preferably 10-36 μm, an average pore size of less than 150 nm, a porosity of 35-70%, and a Gurley value of 50-500 S/100 CC.

2) Imbibition and compressible elasticity: a thickness of the membrane after freely absorbing a DMC solution for one hour at the temperature of 30° C. is enlarged to be (1.05-1.30) times that before the DMC solution absorption. The membrane after DMC solution absorption is exerted with a 0.35 megapascal static compressive stress in a thickness direction for 5 minutes, and a compression deformation of the membrane in the thickness direction is approximately between 5% and 25% of that before the compression. The thickness of the membrane five minutes after releasing from the compressive stress is recovered to be more than 85% of that before the compression.

3) The membrane has a longitudinal tensile strength of 50-200 megapascal, an elasticity modulus of larger than 800 megapascal, and a longitudinal elongation at break of larger than 30%. The membrane has a transverse tensile strength of 30-150 megapascal, an elasticity modulus of larger than 300 megapascal, a transverse tensile strength of larger than 50%, and an acupuncture strength of larger than 300 gf/20 μm.

4) Thermal shutdown and high temperature resistance: a 0.35 megapascal static compressive stress is exerted on the thickness direction, the membrane is heated from 90 to 200° C. at a heating rate of 1° C./min, and a thermal shutdown temperature is no higher than 145° C. When the temperature is maintained at 200° C. for 5 min and then decreased to a room temperature, a physical state of the membrane keeps intact, both the heat shrinkage rates in the longitudinal direction and the transverse direction are smaller than 10%, and the Gurley value is larger than 2000 S/100 CC.

Based on comprehensive requirements on the characteristics of the high intensity, the thermal shutdown, the high temperature resistance, and the compressible elasticity of the membrane of the lithium ion power battery, the membrane of the invention is designed to be a composite microporous structure having functionally complementary two layers A/B or three layers A/B/A in the thickness direction. To be economic, a two-layer co-extruding process is preferably adopted. The layer B contains the polyolefin as a main body, and a rubber content thereof accounts for less than 20 wt. % of a total weight, which is mainly for the purpose of realizing a high intensity and high temperature thermal shutdown property of the composite membrane. At least the layer A of the microporous membrane is designed to be the nano microporous membrane having a high rubber content. The rubber raw material before crosslinking is specially selected from a liquid rubber of low molecular weight or a rubber having low crystallinity in a waxy solid state at room temperature, such rubber raw material can be easily mixed with the high temperature compatibilizer at 70-110° C. to form a viscous fluid having a viscosity therebetween. Preferably, the dynamic viscosity of the viscous fluid is controlled at 1-50 Pa·S at 90-110° C. Thus, the viscous fluid can be easily measured and fed into a mixing-processing device, such as a twin screw extruder. The polyolefin plastic raw material is optionally in particle or powder state, and preferably in the powder state, so that the polyolefin plastic is prone to be uniformly mixed with the high temperature compatibilizer and the liquid rubber to form a slurry which is then fed to the extruder. The polyolefin plastic matrix is uniformly mixed at 170-220° C. to form a thermodynamic solution, chill casted, and the sheet material is then hot stretched, during which, physical morphology transformations including microfibrillation and network of the polyolefin plastic matrix occur in the sheet material. The high temperature compatibilizer and the compound viscous fluid of the liquid rubber distributed therein are combined with the microfibers and are deformed along with the hot stretching, so that the rubber/plastic material are uniformly distributed in the microstructure. After that, the electron beam irradiation crosslinking is utilized, and the crosslinked rubber has high elasticity to offset the elasticity insufficiency of the polyolefin matrix. Thus, the membrane has the compressible elasticity and high temperature rupture resistance and prohibits the polyolefin solid or the melt from thermal shrinkage at the high temperature, thereby preventing the negative pole piece and the positive pole piece from short circuit and therefore improving the safety and reliability and the service life of the lithium ion battery.

The rubber raw material adopts an unvulcanized liquid rubber compatible with the polyolefin or a rubber (in a viscous flow state at the temperature of above 60° C.) with low crystallinity in a waxy solid state at room temperature that has a weight average molecular weight of 30000-80000, a dynamic viscosity (Brookfield Viscosity, 7# rotor) of 50-1500 Pa·S at a temperature of 60° C., and a chemical gel content of less than 10 wt. %. The rubber material comprises: an irradiation crosslinkable ethylene-propylene methylene copolymer (EPM), an ethylene propylene diene rubber (EPDM), an ethylene acrylic rubber, and a diene rubber. The diene rubber is selected from the group consisting of a polyisoprene rubber (IR), a butadiene rubber (BR), a nitrile butadiene rubber (NBR) having less than 20 wt. % of an acrylonitrile, a styrene butadiene rubber (SBR) having less than 20 wt. % of a styrene, and a combination thereof. In order to facilitate the irradiation crosslinking and considering the compatibility of the material, the rubber material is preferably the nonpolar EPM and EPDM that having solubility approximately the same as that of the high density polyolefin matrix, more preferably, the weight ratio of ethylene/propylene in the main chain is between (50:50) and (85:15), and an appropriately high proportion of ethylene is helpful for the irradiation crosslinking. Due to the steric hindrance effect of methyl, irradiation crosslinking rarely happens in the propylene segment in the polymer main chain. When the ethylene proportion is too high, partial crystallization of the block copolymer easily occurs. The partial crystallization is helpful for solvent extraction resistance but it also decreases the rubber elasticity. For the EPDM raw materials, the third monomer comprises: ethylidene norbornene (ENB), 1,4-hexadiene (HD), dicyclopentadiene (DCPD), a weight of the third monomer preferably accounts for 3-12% of a total weight of the EPDM for facilitating the irradiation crosslinking.

The polyolefin plastic material of the nano microporous membrane of the composite material is a homopolymer or an α-olefin copolymer of an ethylene, a propylene, and a butane, or a combination thereof, which comprises: a high-density polyethylene (HDPE), a polypropylene (PP), a polybutene (PB), and a linear low density polyethylene (LLDPE). To facilitate the tensile strength, enhance the rupture resistance, and control the shutdown temperature within 130-145° C., the high density HDPE having the weight average molecular weight of 500,000 is preferably selected, and the ultrahigh molecular weight polyethylene (UHMWPE) having the weight average molecular weight of 1.5-3 million is more preferably selected. In order to improve the compatibility between the polyolefin and the rubber and the cohesive force between the membrane and the battery pole piece, a combination of the maleic anhydride grafted modified polyethylene (MAH-PE) and the UHMWPE is utilized as the raw material of the polyolefin. Preferably, MAH-PE accounts for more than 10 wt. % of the weight of the polyolefin plastic raw material.

A high temperature compatibilizer used for preparation of the nano microporous membrane of the composite material is an ester plasticizer having a high boiling point, a low molecular weight (having a molecular weight of smaller than 600), a low dynamic viscosity (smaller than 0.2 Pa·S), or a combination thereof, and comprises: a paraffin oil, dioctyl sebacate (DOS), diisononyl phthalate (DINP), and didecyl phthalate (DIDP).

The above raw materials are conducted with thermally induced phase separation method reasonably combined with biaxially stretching and strengthening, extraction, and irradiation crosslinking to manufacture the nano microporous membrane based on the rubber/plastic composite material in the form of an analog interpenetrating polymer network (IPN), and the main process and the design idea are illustrated as follows:

(1) Blending and mixing raw materials, and sheet casting: the raw materials comprising the polyolefin, the high temperature compatibilizer, the liquid rubber or the waxy rubber, and the antioxidant are mechanically blended uniformly at a temperature of 70-110° C. to yield a slurry. The slurry is swelled for 8-24 hrs, and the slurry after stable measurement is then introduced to a continuous mixer, such as the twin screw extruder. The mixed raw material is processed into a thermodynamic uniform solution at the high temperature of 170-220° C., the uniformly mixed high temperature melt is extruded from the coextrusion die, condensed continuously and quickly on a surface of a metal roller, and a semi-finished gel sheet A in a physical gel state is obtained after the phase separation. The easily crystallized polyolefin serves as a three dimensional network skeleton to provide intensity and sufficient stiffness for the semi-finished sheet A, thereby being beneficial for subsequent biaxial stretching. The crystallized polyolefin basically remains in physical states of fine platelets or spherulites, while the viscous fluid containing a mixture of the high temperature compatibilizer and the rubber are ultrafinely distributed on the semi-finished gel sheet A.

(2) Biaxially hot stretching and strengthening: the semi-finished gel sheet A is preheated to 105-130° C. to a highly plastic state and is then calendered and strengthened, and a thickness calendering ratio is controlled at 1-2.5. The calendering process is adapted to enhance the intensity in the thickness direction so as to avoid large decrease in porosity or influence on the internal resistance when the membrane is in face of pressure. The biaxial hot stretching strengthening process transforms the polyolefin from physical states from fine platelets or spherulites into microfibrillated and network physical state via thermoplastic tensile deformation. As the viscous fluid of the combination of the rubber and the high temperature compatibilizer distributed among the polyolefin plateles or spherulites has the relatively low viscosity, plastic deformation, flowing, and filling occur in the viscous fluid along with the microfibers, and the viscous fluid is uniformly distributed in the three dimensional network skeleton formed by the polyolefin microfibers after the hot stretching, thereby forming a stretched and strengthened semi-finished membrane B of the composite material. The hot stretching temperature is 105-130° C., and the hot stretching ratios are 3-7 in a machine direction (MD1) and 3-7 in a transverse direction (TD1). The biaxial stretching is conducted step by step or synchronously, and preferably the synchronous stretch process based on stable longitudinal stretching.

(3) Low temperature extraction: alkanes and halogenated alkanes, such as decane, R22, R125, and tetrachloroethylene, are utilized as an extraction solvent. The high temperature compatibilizer having low molecular weight and low viscosity is selectively extracted by the extraction solvent from the semi-finished membrane B2 of the composite material under a normal pressure or a high pressure of 2-7 megapascal at a temperature of 0-55° C. so as to yield a semi-finished microporous membrane C2 based on the rubber/plastic composite material in the form of an analog interpenetrating polymer network (IPN) basically excluded from the high temperature compatibilizer. The rubber component distributed among the network of the semi-finished membrane B2 of the composite material is not prone to be extracted but remains in situ in the three dimensional network formed by the polyolefin microfibers, which may due to the following principles: the rubber component has much larger the molecular weight than that of the high temperature compatibilizer; the high polymer rubber has relatively large viscosity, weak Brownian movement when the extraction temperature is controlled at less than 55° C.; almost no shearing or stretching mechanical force exist during the extraction; the high polymer rubber is not easily untangled; and partial thermal crosslinking possibly happens on the rubber component during the heat processing procedures including the high temperature blending at 170-220° C. and the hot stretching.

The pore size, the thickness, and the width of the microporous membrane are properly shrunk due to the surface tension in case of evaporation and drying of the solvent after the extraction. Preferably, the second hot stretching and hot shaping is conducted on the semi-finished microporous membrane C2 based on the rubber/plastic composite material in the form of the analog IPN after the extraction to continuously regulate parameters comprising the pore size, the porosity, and the thickness to yield a basically finished microporous membrane D based on the rubber/plastic composite material in the form of the analog IPN.

(4) In-line electron beam irradiation crosslinking: the basically finished microporous membrane D based on the rubber/plastic composite material in the form of the analog IPN after the extraction is conducted with in-line electron beam irradiation crosslinking with an irradiation dose of 50-250 KGy and preferably under the protection of nitrogen against oxidation, and then cool rolled to yield the nano microporous membrane based on a composite material of the post-crosslinked rubber and the polyolefin. Too low the irradiation dose may result in inefficiency of the crosslinking degree, and too high the irradiation dose easily causes decomposition of the polyolefin. After steps (1), (2), and (3), the thermoplastic rubber components are uniformly distributed in the network of the polyolefin microfibers. The main purpose for the irradiation is enabling the rubber component to crosslink in situ to form high polymer type network thereby improving the elasticity. When the polyolefin preferably adopts the high density polyethylene HDPE, partial irradiation crosslinking also happens on the high polymer PE of the tangled non-crystallized zone of the polyethylene fiber network, so as to improve the creep resistance of the microporous membrane in conditions of long time compression in the use of the battery and to improve the resilience of the microporous membrane.

The irradiation crosslinking procedure can be conducted in the nonporous state before the extraction procedure (3), so that there is no need to consider the negative influence of the oxygen existing in the microporous materials during the irradiation. The basic procedure of the irradiation-extraction process is as follows: the semi-finished gel sheet A after the sheet casting is conducted with hot-melt calendaring, biaxially hot stretching and strengthening, in-line electron beam irradiation crosslinking, low temperature extraction, second hot stretching, hot shaping, and cool rolling, subsequently. The semi-finished gel sheet A is preheated, calendered and strengthened in a thickness direction with a thickness calendering ratio of 1-2.5. Biaxially hot stretching and strengthening is conducted at a hot stretching temperature of 105-130° C. with hot stretching ratios of 3-7 in the MD1 and 3-7 in the TD1. In-line electron beam irradiation crosslinking is then conducted on the biaxially stretched membrane after the biaxial stretching, in which, an irradiation dose is 50-250 KGy. Low temperature extraction is performed at a temperature of 0-55° C. under a normal pressure or a high pressure of 2-7 megapascal adopting an extraction solvent comprising alkanes and halogenated alkanes to selectively extract to remove the high temperature compatibilizer from the semi-finished membrane, whereby obtaining a semi-finished microporous membrane C1 based on polyolefin/rubber basically excluded from the high temperature compatibilizer. Thereafter, the second hot stretching and hot shaping are conducted on the semi-finished microporous membrane C1 after the extraction to continuously regulate parameters comprising the pore size, the porosity, the thickness, and then cool rolled to yield the nano microporous membrane based on the composite material of the post-crosslinked rubber and the polyolefin. The irradiation-extraction process must control the rubber/plastic ratio of the raw material, the elasticity of the membrane is properly decreased to preferably decrease the rubber/plastic ratio of the membrane raw material to below (40:60), so that the post-crosslinked rubber and the polyolefin microfiber form the relatively weak analog IPN structure, or in a basic island/sea discontinuous rubber distribution pattern. When the rubber phases are uniformly and densely embedded in the polyolefin microfibers network matrix like islands, plastic deformations of the rubber phase occurs along with the polyolefin microfibers network matrix in the second hot stretching after the extraction so as to prevent the membrane from wrinkling after the second hot stretching. It is not convenient for the membrane in an enhanced IPN structure having high rubber/plastic ratio to adopt the biaxial stretching process to regulate the parameters such as the porosity, the pore size, and the thickness because that the increase of the crosslinking degree of the rubber component results in increase of the elasticity and sharp decrease of the plasticity, the crosslinking network-like distributed rubber contributes to the high elasticity to a certain degree in the planar direction, which easily causes wrinkling of the membrane after the second hot stretching.

Compared with the above described coating methods, the composite membrane prepared by the co-extruded processing method of the invention has simple production process and the low production cost. In addition, in the semi-finished product of the double-layer AB structure during the co-extruded processing, the high temperature melt of the polyethylene or the polyolefin tangles at the interface, so that the high adhesive strength/peeling strength between the two layers are ensured. A peeling strength larger than 10 gf/cm between the layers A and B is capable of inhibiting thermal shrinkage of the polyethylene-predominant layer B at high temperature by using the rubber-predominant layer A.

The appropriate pore size and porosity of the co-extruded composite membrane are comprehensively presented on the permeability index Gurley value. Too high the Gurley value means large microporous membrane resistance and poor permeability of the membrane, particularly after the compression, so that the battery capacity cannot be effectively adopted. Too low the original Gurley value means that the membrane has relatively large pore size, high porosity, or is predominant in large sized pores, the fast self-discharge or occurrence of short circuit easily occurs in the battery, and the safety of the battery is poor. Thus, a preferable Gurley value of the co-extruded composite membrane is 50-500 S/100 CC at room temperature, an average pore size of the membrane is less than 200 nm, and a more preferable average pore size of the membrane is less than 150 nm.

DETAILED DESCRIPTION OF THE EMBODIMENTS

Specific modes for carrying out the invention are illustrated hereinbelow. It should be noted that the following examples are intended to describe and not to limit the invention.

Evaluation Method for Membrane Property (1) Chemical Gel Content

A certain weight of a rubber raw material was added to xylene and boiled at 100° C., or a finished membrane was boiled at 135° C., for more than 12 hrs. Soxhlet extraction was adopted, a residue W2 was weighed after membrane filtration and was compared with an original weight W1. An insoluble matter was defined as a gel, which also referred to a chemical gel content.

(2) Membrane Thickness (μm)

A CHY-C2 type thickness gauge manufactured by Labthink instruments Co., Ltd. was used for measurement. A porous membrane sample having a size of 50 mm×50 mm was collected, and the thickness gauge was used to evenly measure the sample surface using a five-point measuring method for calculating an average thickness.

(3) Porosity

Porosity of the porous membrane was measured according to the JISP8117 standard.

(4) Acupuncture Strength

CMT4000 type electron testing machine manufactured by MTS company was utilized. An acupuncture strength was measured using a needle having a spherical front end (curvature radius R: 0.5 mm) and a diameter of 1 mm and inserting the needle into the polyolefin microporous membrane at a speed of 2 mm/s to measure a maximum load.

(5) Tensile Strength, Elasticity Module, and Elongation at Break

According to the GB/T1040.1-2006 standard, a strip membrane sample having a width of 25 mm was used, and the CMT4000 type electron testing machine manufactured by the MTS company was used for measurement.

(6) Average Pore Size

According to the ISO15901.1-2006 standard, a pore size distribution and an average pore size of the membrane were measured by a mercury analyzer under a pressure of 20-2000 Psi.

(7) Porosity

The membrane prosthesis density (g/cm$^3$)=weight of membrane/(thickness*area) was calculated and divided by a theoretical value 0.94 g/cm$^3$, thereby yielding the porosity of the microporous membrane.

(8) Imbibition and Compressible Elasticity of Membrane

The membrane was immersed in dimethyl carbonate (DMC) for imbibition for 1 hr at a temperature of 30° C., and thicknesses before and after the imbibition were measured, respectively. Then, a 0.35 megapascal compressive stress was exerted on the membrane in the thickness direction and maintained for 5 min, and thicknesses before and after the press were measured by a film thickness tester.

(9) Tests of Thermal Shutdown, Thermal Shrinkage, and High Temperature Rupture Resistance The membrane was pressed under a middle part of a glass plate, and the 0.35 megapascal static compressive stress was exerted in the thickness direction. The membrane was heated from 90 to 145° C. at a heating rate of 1° C./min, and the temperature of the membrane was maintained at 145° C. for 5 min and then decreased to room temperature to measure the Gurley value, and if the Gurley value was larger than 2000 S/100 CC, it was assumed that the thermal shutdown temperature was smaller than 145° C. The membrane was heated from 90 to 200° C. at a heating rate of 1° C./min, the temperature of the membrane was then maintained at 200° C. for 5 min and then decreased to room temperature to measure the Gurley value and observe an integrity of the physical state of the membrane. The lengths in the longitudinal direction and the transverse direction of the membrane after the heat shrinkage were measured, the heat shrinkage rates=(original length−length after shrinkage)/original length*100%.

Example 1

Nano Microporous Membrane Based on a Composite Material of a Post-Crosslinked Rubber and Polyolefin and a Manufacturing Method Therefor Ingredients for Preparation of Co-Extruded Composite Membrane:

Ingredients for layer A comprise: 10 weight parts of an ultrahigh molecular weight polyethylene (UHMWPE) having a weight average molecular weight (Mw) of 2.5 million; 15 weight parts of a maleic anhydride grafted high density polyethylene (MAH—high density PE) having the weight average molecular weight of 350000; 10 weight parts of a liquid state ethylene propylene diene rubber EPDM (Trilene77) having the weight average molecular weight of 42000, a Brookfield viscosity of 800 Pa*S at the temperature of 60° C., a weight ratio of ethylene to propylene of 75/25, and 10.5 wt. % of a content of a third missile body ENB; 65 weight parts of dioctyl sebacate (DOS); and 0.3 weight parts of an antioxidant 1010.

Ingredients for layer B comprise: 10 weight parts of the UHMWPE having the weight average molecular weight (Mw) of 2.5 million; 15 weight parts of the MAH—high density PE having the weight average molecular weight of 350000; 5 weight parts of the liquid state EPDM (Trilene77) having the Brookfield viscosity of 800 Pa*S at the temperature of 60° C., the weight ratio of ethylene to propylene of 75/25, and 10.5 wt. % of a content of the third missile body ENB; 70 weight parts of DOS; and 0.3 weight parts of the antioxidant 1010.

Preparation of Co-Extruded Composite Membrane (1) Ingredients blending, co-extruding, and sheet casting: ingredients for the layers A and B were respectively stirred in vacuum agitators at a temperature of 95° C., swelling mixed for 16 hrs, and prepared into uniform slurries. The slurries of the same feed quantities were respectively input by metering pumps into co-rotating parallel twin screw extruders A, B having length-diameter ratios of 1:60 to melt and blend the slurries, temperatures of the extruders were controlled within a range of 185-210° C. Melts of the layers A and B passed through a mixer to enter a same coextrusion die where the melts were extruded and chill casted. The cooling speed was larger than 200° C./30 s, and a thickness of the casting sheet was controlled at 1.6 mm.

(2) Hot-melt calendering, simultaneously biaxially hot stretching and strengthening, and in-line irradiation cross-linking: the composite sheet after sheet casting was pre-heated at the temperature of 115-125° C. and holt-melt calendered, a calendering ratio was 1.3, and then conducted with simultaneous stretching to reach a longitudinal stretch ratio of 4 and a transverse stretch ratio of 3. The membrane taken out of a synchronous oven was processed by a 500 kV self-shielding electron curtain accelerator for in-line irradiation crosslinking, and an irradiation dose was 150 KGy. The material was cooled to a temperature of 30° C. below, combined with a PP nonwoven cloth, and then rolled, and a coil diameter was 900 mm.

(3) Gas-liquid two-phase high pressure extraction: the rolled composite product was washed in an extraction kettle, and the washing process was specifically conducted at a washing temperature of 55° C., a washing pressure of 6.0 megapascal, a separation pressure of 1.5-1.8 megapascal, and a separation temperature of 65° C. An extraction solvent was circulated in the whole system to wash the product.

(4) Hot stretching step by step, the semi-finished membrane after the extraction was preheated at 115-125° C., and conducted with longitudinal hot stretching for a longitudinal stretch ratio of 1.5 and subsequently transverse hot stretching for a transverse stretch ratio of 1.3, and a heat stretch temperature was 125° C.

(5) Hot-setting treatment: the transverse hot stretched membrane was maintained in the width direction for 20-40 s at 115-128° C.

(6) Cool rolling: the membrane after the above hot-setting treatment was cooled to 30° C., and then rolled to yield a finished co-extruded composite microporous membrane.

The co-extruded composite membrane has the following features:

A product thickness was 25 μm, an average pore size was 95 nm, a porosity was 48%, a Gurley value was 200-260 S/100 CC, a tensile strength was 128 megapascal in a machine direction (MD) and 85 megapascal in a transverse direction (TD), a longitudinal elongation at break was 55% and in a transverse elongation at break was 113%, an elasticity modulus was 1492 megapascal in the MD and 831 megapascal in the TD, the acupuncture strength was 390 gf, and a chemical gel content was 30 wt. %.

The 0.35 megapascal static compressive stress was applied on the co-extruded composite membrane in the thickness direction for 5 min at the temperature of 30° C., and the thickness of the co-extruded membrane was 23 μm. 5 min after being released from the compression, the thickness of the co-extruded composite membrane was measured to be 24 μm. After 2000 cycles of compression/release, it was proved that the membrane still kept the compressible elasticity and the thickness of the co-extruded composite membrane 5 min after being released from the compression was 22 μm.

The co-extruded composite membrane was immersed in DMC for imbibition for 1 hr. The thickness after imbibition was 30 μm. The 0.35 megapascal static compressive stress was applied on the co-extruded composite membrane in the thickness direction after the imbibition and kept for 5 min, and the thickness of the co-extruded composite membrane was 28 μm. 5 min after being released from the compression, the thickness of the co-extruded composite membrane was 29 μm. Thus, after 2000 cycles of compression in the imbibition state/release, the membrane still kept the compressible elasticity and the thickness of the co-extruded composite membrane 5 min after the pressure release was measured to be 25 μm.

The 0.35 megapascal static compressive stress was applied on the co-extruded composite membrane in the thickness direction at 145° C. and maintained for 60 min, then the temperature was decreased to room temperature, and the morphology of the membrane still keeps intact. The heat shrinkage rates in both the longitudinal direction and the transverse direction were smaller than 8%, and the Gurley value was larger than 2000 S/100 CC.

The 0.35 megapascal static compressive stress was applied on the co-extruded composite membrane in the thickness direction. The co-extruded composite membrane was heated from 90° C. to 200° C. at a heating rate of 1° C./min. The temperature was kept at 200° C. for 5 min and then decreased to room temperature. The membrane still kept integral, the heat shrinkage rates in both the longitudinal direction and the transverse direction were smaller than 6%, and the Gurley value was larger than 2600 S/100 CC.

The composite membrane was applied in battery, a side A thereof contacts with a negative pole piece of the battery, and a side B thereof contacts with the positive pole piece, the cathode and positive pole pieces were pressurized in conditions of 95° C./1 megapascal for 15 min before injection of an electrolyte. After being dried, the electrolyte was injected to prepare a lithium ion battery. The lithium ion battery was tested by 150° C. hot box, acupuncture, short circuit, and 1 C cycle at room temperature of 25° C., and it was proved that the lithium ion battery passes all the safety tests, and the cycle life thereof was 2350 times.

Comparison Example 1

Preparation of the lithium ion battery was the same as that in Example 1 except that the membrane was the PP/PE/PP membrane provided by a certain company. The provided PP/PE/PP membrane had a thickness thereof 25 μm, a porosity of 40%, a Gurley value of 600-630 S/100 CC, a tensile strength of 165 megapascal in the MD and 13 megapascal in the TD, and a transverse elongation at break of ≤12%. The 0.35 megapascal static compressive stress was applied on the membrane in the thickness direction for 5 min at the temperature of 30° C., and the thickness of the co-extruded composite membrane was 23.5 μm. 5 min after being released from the stress, the thickness of the membrane still remained at 23.5 μm, so that the membrane lacked the elastic resilience. After 50 cycles of compression/release, the thickness of the membrane was 23 μm, and the test was then stopped.

The cycle life of the battery was 635 times. In the safety tests, the battery passed the short circuit test but failed to pass the 150° C. hot box and the acupuncture tests.

Comparison Example 2

The preparation of the battery was the same as that of Example 1 except that the membrane herein was the single-layer PE membrane prepared by the wet method provide by a certain company. The single-layer PE membrane had a thickness of 25 μm, a porosity of 49%, a Gurley value of 95 S/100 CC, a tensile strength of 143 megapascal in the MD and 21 megapascal in the TD, the longitudinal elongation at break of 42%, and the transverse elongation at break of 344%.

The 0.35 megapascal static compressive stress was applied on the membrane in the thickness direction for 5 min at the temperature of 30° C., and the thickness of the co-extruded composite membrane was 23 μm. 5 min after being released from the stress, the thickness of the membrane still remained at 23 μm, so that the membrane lacked the elastic resilience. After 50 cycles of compression/release, the thickness of the membrane was 22 μm, and the test was stopped.

The cycle life of the battery was 876 times. In the safety tests, the battery passed the acupuncture test but failed to pass the 150° C. hot box and the short circuit tests.

The invention claimed is:

1. A membrane based on a composite of a post-crosslinked rubber and a polyolefin plastic, the membrane comprising at least one membrane layer A having at least 20 wt. % of a chemical gel, the membrane and the membrane layer A both having a pore diameter of nano-scale, the membrane layer A comprising a nano microfiber matrix of polyolefin, and the post-crosslinked rubber, the post-crosslinked rubber being uniformly distributed in the matrix and being prepared by irradiating a raw rubber; wherein a weight ratio of the raw rubber to the plastic is between (20:80) and (50:50);

the raw rubber is a liquid rubber or a waxy rubber selected from the group consisting of: an ethylene-propylene methylene copolymer (EPM), an ethylene propylene diene rubber (EPDM), an ethylene acrylic rubber, and a diene rubber; wherein the diene rubber is selected from the group consisting of a polyisoprene rubber (IR), a butadiene rubber (BR), a nitrile butadiene rubber (NBR) having less than 20 wt. % of an acrylonitrile, a styrene butadiene rubber (SBR) having less than 20 wt. % of a styrene, and a combination thereof;

the polyolefin plastic is a homopolymer selected from the group consisting of a high-density polyethylene (HDPE) having a weight average molecular weight of more than 500,000, a polypropylene (PP), a polybutene (PB), a linear low density polyethylene (LLDPE), an α-olefin copolymer, and a combination thereof;

and the membrane has the following properties:

1) the membrane has a total thickness of 10-36 μm, an average pore size of less than 150 nm, a porosity of 35-70%, and a Gurley value of 50-500 S/100 CC;

2) imbibition and compressible elasticity: a thickness of the membrane after freely absorbing a DMC solution for one hour at the temperature of 30° C. is enlarged by (1.05-1.30) times; the membrane after DMC solution absorption is exerted with a 0.35 megapascal static compressive stress in a thickness direction for 5 minutes, and a compression deformation of the membrane in the thickness direction is approximately between 5% and 25% of that before the compression; and the thickness of the membrane five minutes after release of the compressive stress is recovered to be more than 85% of that before the compression;

3) the membrane has a longitudinal tensile strength of 50-200 megapascal, an elasticity modulus of larger than 800 megapascal, and a longitudinal elongation at break of larger than 30%; the membrane has a transverse tensile strength of 30-150 megapascal, an elasticity modulus of larger than 300 megapascal, a transverse tensile strength of larger than 50%, and an acupuncture strength of larger than 300 gf/20 μm; and 4) thermal shutdown and high temperature resistance: a 0.35 megapascal static compressive stress is exerted on the thickness direction, the membrane is heated from 90 to 200° C. at a heating rate of 1° C./min, and a thermal shutdown temperature is no higher than 145° C.; when the temperature is maintained at 200° C. for 5 min and then decreased to room temperature, a physical state of the membrane keeps intact, heat shrinkage rates in both the longitudinal direction and the transverse direction are smaller than 10%, and the Gurley value is larger than 2000 S/100 CC.

2. The membrane of claim 1, wherein the polyolefin plastic comprises more than 10 wt. % of a maleic anhydride grafted polyethylene (MAH-PE).

3. A method for manufacturing the membrane of claim 1, the method comprising:

a) mechanically blending the polyolefin plastic, a compatibilizer, the raw rubber, and an antioxidant uniformly at a temperature of between 70 and 110° C. to yield a slurry, swelling the slurry for 8-24 hrs to produce a swelled slurry, introducing the swelled slurry after stable measurement to a twin screw extruder for continuous mixing, and performing sheet casting to produce a semi-finished gel sheet A; wherein the compatibilizer is selected from the group consisting of dioctyl sebacate (DOS), diisononyl phthalate (DINP), didecyl phthalate (DIDP), and a combination thereof;

b) biaxially hot stretching and strengthening the semi-finished gel sheet A;

c) performing in-line electron beam irradiation crosslinking; and d) performing low temperature extraction, second hot stretching, and hot shaping.

4. The method of claim 3, wherein the semi-finished gel sheet A is processed as follows:

the semi-finished gel sheet A is preheated, calendered and strengthened in a thickness direction with a thickness calendering ratio of between 1 and 2.5, followed by biaxially hot stretching and strengthening at a hot stretching temperature of 105-130° C. and hot stretching ratio of 3-7 in a machine direction (MD1) and 3-7 in a transverse direction (TD1);

the biaxially stretched membrane after the biaxial stretching is treated with in-line electron beam irradiation crosslinking with an irradiation dose of 50-250 KGy;

low temperature extraction is performed using an extraction solvent comprising alkanes and halogenated alkanes to selectively extract to remove the compatibilizer from a semi-finished membrane at a temperature of 0-55° C. under a normal pressure or a high pressure of 2-7 megapascal, whereby obtaining a semi-finished microporous membrane C1 based on polyolefin/rubber basically excluded from the high temperature compatibilizer; and the semi-finished microporous membrane C1 after the extraction is performed with the second hot stretching and hot shaping to continuously regulate parameters comprising the pore size, the porosity, the thickness, and then cool rolled to yield the membrane.

5. The method of claim 3, wherein the semi-finished gel sheet A is processed as follows:

the semi-finished gel sheet A is preheated, calendered and strengthened in a thickness direction with a thickness calendering ratio of 1-2.5, and biaxially hot stretched and strengthened at a hot stretching temperature of 105-130° C. and hot stretching ratio of 3-7 in a machine direction (MD1) and 3-7 in a transverse direction (TD1);

low temperature extraction is performed using an extraction solvent comprising alkanes and halogenated alkanes to selectively extract to remove the compatibilizer from the semi-finished membrane at a temperature of 0-55° C. under a normal pressure or a high pressure of 2-7 megapascal, whereby obtaining a semi-finished microporous membrane C2 based on the rubber/plastic composite material in the form of an analog interpenetrating polymer network (IPN);

the semi-finished microporous membrane C2 is performed with the second hot stretching and hot shaping to continuously regulate parameters comprising the pore size, the porosity, and the thickness to yield a basically finished microporous membrane D based on the rubber/plastic composite material in the form of the analog IPN; and the basically finished microporous membrane D is treated by in-line electron beam irradiation crosslinking with an irradiation dose is 50-250 KGy, and then cool rolled to obtain the membrane.

6. A lithium ion battery comprising: a positive pole piece, a negative pole piece, an electrolyte, and the membrane of any one of claims 1 and 2.

7. The membrane of claim 1, wherein the membrane further comprises a layer B, wherein the layer B comprises the polyolefin plastic as a main body, and the post-crosslinked rubber, the post-crosslinked rubber being present at an amount of less than 20 wt. % of the layer B.

8. The membrane of claim 1, wherein the membrane is prepared through a method comprising:

a) mechanically blending the polyolefin plastic, the raw rubber, a compatibilizer, and an antioxidant uniformly at a temperature of between 70 and 110° C. to yield a slurry, swelling the slurry for between 8 and 24 hrs to yield a swelled slurry, introducing the swelled slurry to a twin screw extruder for continuous mixing, and performing sheet casting to produce a semi-finished gel sheet A; wherein the compatibilizer is selected from the group consisting of dioctyl sebacate (DOS), diisononyl phthalate (DINP), didecyl phthalate (DIDP), and a combination thereof;

b) biaxially hot stretching and strengthening the semi-finished gel sheet A;

c) performing in-line electron beam irradiation crosslinking; and d) performing low temperature extraction, second hot stretching, and hot shaping.

9. The method of claim 3, wherein an irradiation dose in c) is between 50 and 250 KGy.

* * * * *